No. 834,374. PATENTED OCT. 30, 1906.
B. ENRIGHT.
MANUFACTURE OF HYDRAULIC CEMENT AND THE APPARATUS THEREFOR.
APPLICATION FILED JUNE 12, 1906.
2 SHEETS—SHEET 1.
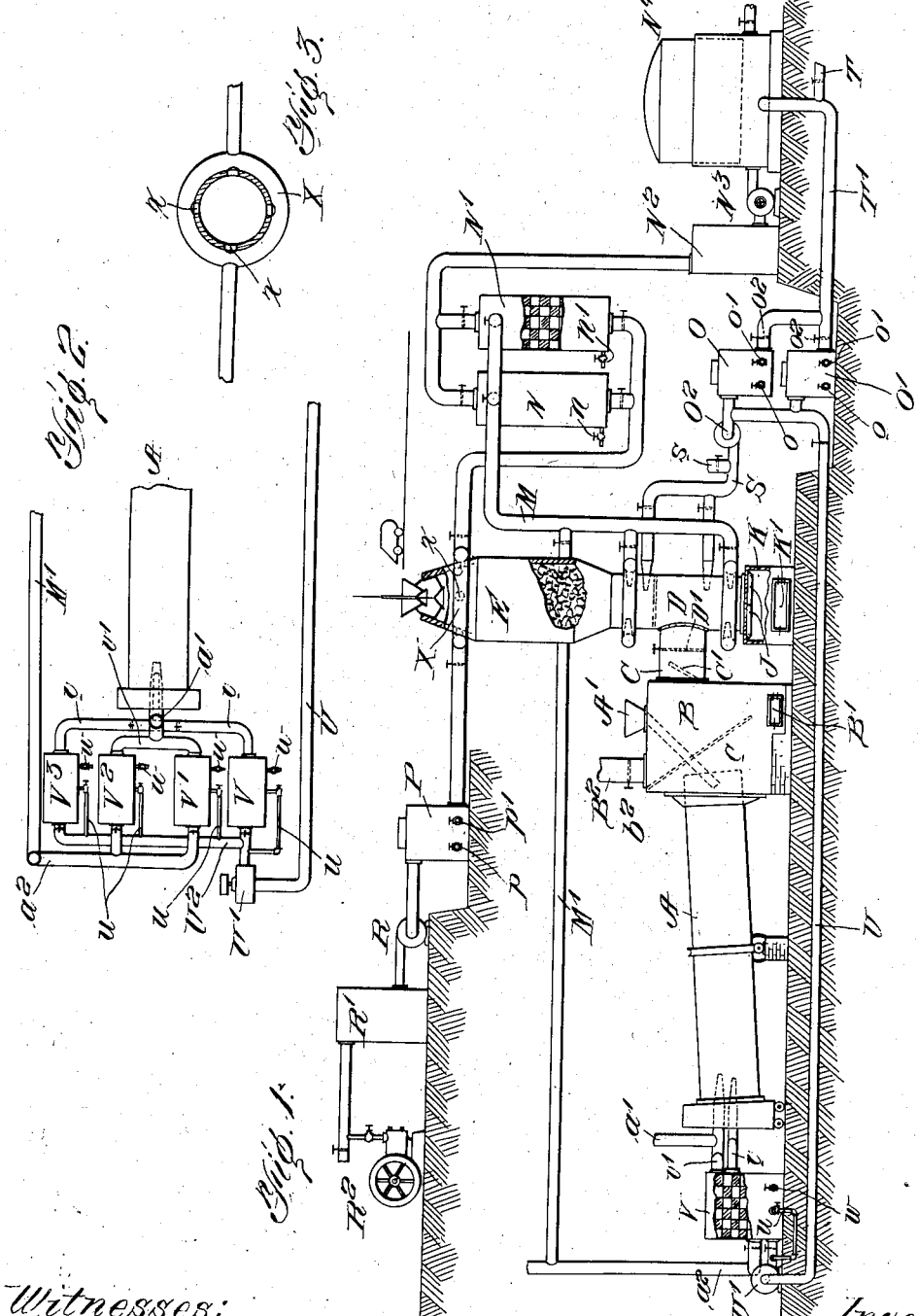
Witnesses:
Paul J. Gathmann
E. B. Bruner
Inventor:
Bernard Enright
By his Attorneys:
Bulwin Wight No. 834,374. PATENTED OCT. 30, 1906.
B. ENRIGHT.
MANUFACTURE OF HYDRAULIC CEMENT AND THE APPARATUS THEREFOR.
APPLICATION FILED JUNE 12, 1906.
2 SHEETS—SHEET 2.
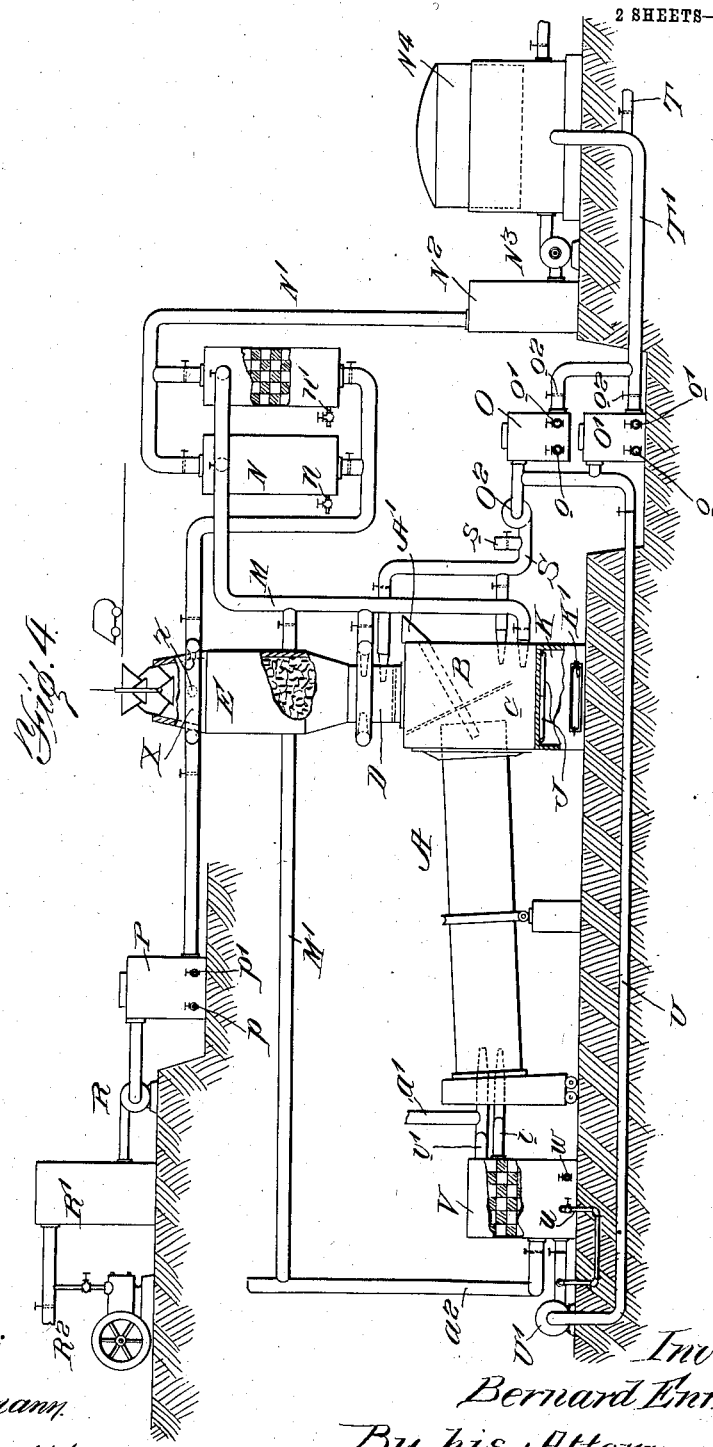
Witnesses:
P. J. Gathmann
C. B. Bruner
Inventor:
Bernard Enright
By his Attorneys:
Baldwin Wight

UNITED STATES PATENT OFFICE.

BERNARD ENRIGHT, OF SOUTH BETHLEHEM, PENNSYLVANIA.

MANUFACTURE OF HYDRAULIC CEMENT AND THE APPARATUS THEREFOR.

No. 834,374. Specification of Letters Patent. Patented Oct. 30, 1906.

Application filed June 12, 1906. Serial No. 321,340.

*To all whom it may concern:*

Be it known that I, BERNARD ENRIGHT, a citizen of the United States, residing in South Bethlehem, in the county of Northampton and State of Pennsylvania, have invented certain new and useful Improvements in the Manufacture of Hydraulic Cement and the Apparatus Therefor, of which the following is a specification.

The object of my invention is to manufacture hydraulic cement in an economical manner and to utilize the gases produced in such manufacture for various purposes.

In my United States Patent No. 815,080, of March 13, 1906, I have shown an apparatus in which the products of combustion and decomposition from a rotary clinker-forming cement-kiln are conveyed to a vertical kiln charged with incandescent fuel and cement-producing material wherein the cement-producing material is calcined and the carbon dioxid issuing from the rotary kiln, as well as that formed or set free in the vertical kiln, are converted into carbon monoxid, such carbon monoxid being employed for various industrial purposes, such as to run gas-engines, assist in heating a rotary kiln, &c.

I have found that cement-making apparatus may be so organized and operated that economic results may be obtained by causing the products of combustion and decomposition from a rotary kiln to pass through a vertical kiln without having its carbon dioxid reduced to carbon monoxid, the carbon dioxid being allowed to pass through the vertical kiln, or if the gases are rich in carbon monoxid such carbon monoxid may be changed to carbon dioxid in the vertical kiln and the carbon dioxid issuing from the vertical kiln may subsequently be changed to carbon monoxid in retorts or gas-producers. I have also found that the apparatus may be so organized and operated that the cement-producing material may be calcined without the use of said fuel in the vertical kiln and that the gases rich in $CO_2$ may be allowed to escape from the vertical kiln and be conveyed away or stored for any desired use or carried to a gas-producer wherein they may be converted into carbon monoxid and as such used to run gas-engines, employed to heat boilers, for heating the charge in a vertical kiln, and for other purposes.

In apparatus organized in accordance with my improvements I may utilize the sensible heat of the gases from the rotary kiln in the vertical kiln in connection with the heat produced by the combustion of the carbon monoxid obtained from producers preferably fed with $CO_2$ from the vertical kiln.

The apparatus which I have devised for carrying out my improvements contains certain novel organizations of instrumentalities involving new modes of operation, all of which will be hereinafter fully explained.

One of the important differences between my present improvements and the apparatus shown in my prior patent is that whereas in my prior patent I caused $CO_2$ received from the rotary kiln and the $CO_2$ produced or set free in the vertical kiln to be largely or wholly converted into CO before issuing from the vertical kiln, I now so construct the apparatus and conduct the process that $CO_2$ principally is caused to issue from the vertical kiln and this $CO_2$ is subsequently converted into CO. I preferably also according to my present improvements use no solid fuel in the vertical kiln, depending entirely upon the sensible heat received from the rotary-kiln gases and the heat produced by the combustion of producer-gas or CO supplied to the vertical kiln.

In the accompanying drawings, Figure 1 is a diagram showing the preferred form of apparatus embodying my improvements. Fig. 2 is a plan view of a portion of this apparatus. Fig. 3 is a detail view of the devices employed for receiving and carrying away the gases issuing from the vertical kiln. Fig. 4 is a diagram showing a modified form of the apparatus.

The rotary kiln A may be of any approved type. As shown, it is a rotary clinker-forming cement-kiln of well-known construction. Other forms of rotary kilns may be used. Fuel in the form of gas, oil, or powdered coal may be supplied at $a'$, and air may be admitted at $a^2$. The upper or gas-discharging end of the kiln extends into a casing or housing B, which communicates, through a flue C, with a shaft D, forming the lower part of the vertical kiln E. The cement-forming material may be supplied to the kiln through a conveyer A'. Baffle-plates $c\ c'$ are employed to arrest the dust, or a portion of it, entering the housing and to direct it into a trough B', from which it may be removed automatically or otherwise in any suitable way. The plate $c$ also serves to direct the products of combustion toward the vertical kiln.

The housing or dust-chamber B is provided with a stack $B^2$, having a valve $b^2$. This stack, which I call the "emergency-stack," is only used when for any reason it is undesirable to pass the products of combustion into the vertical kiln or when it is desired to relieve any pressure in the chamber B or to pass only a portion of the products from the rotary kiln into the vertical kiln.

A valve $D'$ is arranged in the flue C, and this can be used for regulating the passage of the products of combustion to the vertical kiln. By properly setting the valves $b^2$ and $D'$ all of the products may pass to the vertical kiln, or some or all of them may be passed to the emergency-stack.

The charge of the vertical kiln preferably consists of layers of cement-rock, limestone, or any other suitable mixture of like nature, no solid fuel being preferably employed. The material may be charged in rather large lumps, so as to permit a suitable draft, and the products of combustion from the vertical kiln pass out into an annular pipe X, Fig. 3, which surrounds the upper end of the vertical kiln and has several ports $x$ communicating therewith, as shown, whereby the gases may be evenly drawn off and distributed.

At the lower portion of the shaft D, I arrange hinged doors J, below which is a compartment K. The burned lime-rock or cement-rock is received on the doors J while the door $K'$ of the compartment K is closed. Then these doors J are lowered, emptying the charge of burned lime or cement rock into the compartment K, and then the doors J are raised, affording an air-tight closure. The burned material may then be removed from the compartment K, ground in the usual way, and fed to the rotary kiln, where the clinkering is performed. I have found that material burned or partially calcined in this way is not only more easily ground, but is more readily converted into clinker in the rotary kiln, and less fuel is required therein than would be the case if the material were not calcined in the manner specified.

The rotary clinker-forming kiln may be fed with fuel and air in such proportions as to produce gases rich in CO, or the fuel and air may be admitted in such proportions as to produce products of combustion in the rotary kiln rich in $CO_2$. These gases are conveyed to the vertical kiln and their sensible heat is imparted to the charge of limestone, &c., therein. The gases issuing from the vertical kiln are largely $CO_2$ gases. A portion of these gases may be conveyed to a gas-producer P, to which air and steam may be admitted at $p\ p'$, and in this producer $CO_2$ is reduced to CO. A fan or blower R causes the gases from the producer to pass through a scrubber $R'$, and thence the gases may be conveyed to a gas-engine $R^2$, to a gasometer, or other place for storage or use, or I may convey the $CO_2$ gases through absorbers $N\ N'$, similar to those shown in my patent above mentioned, which may be cooled by air admitted at $n$ or $n'$. The gases from the absorbers may be first carried through a scrubber $N^2$ and then by the assistance of a suction-pump or blower $N^3$ conveyed to a gas-storage or pressure-equalizing tank $N^4$ of any suitable construction.

I so operate the apparatus that a low pressure is maintained in the vertical kiln, as the gases are more easily liberated under a low pressure than under high pressure, and by using suction-pumps or blowers in the manner specified the gases may be conveyed under suitable pressure to any desired point and through any desired apparatus.

The cooled gases rich in $CO_2$ received by the tank $N^4$ may be, if desired, carried to a condensing plant, and such condensed $CO_2$ may be used for various purposes, or the gases may be conveyed from the tank $N^4$ to one or more gas-producers O $O'$, two preferably being employed. Here the $CO_2$ gases are reduced to CO, and the carbon monoxid may be made to pass, under suitable draft by means of a fan or blower $O^2$, through a conduit S to any desired place for use. For instance, it may be allowed to escape through a branch pipe $s$ and burned under steam-boilers, or it may be conveyed to the bottom of the vertical kiln. Preferably two connections are made to the vertical kiln—one in the lower portion of the stack and one at a higher elevation in the lower portion of the charge of limestone, &c. Here the CO gases may be burned for the purpose of calcining the charge in the vertical kiln. The sensible heat received from the rotary-kiln gases is not sufficient to calcine the charge; but the sensible heat from the rotary kiln and the heat produced by the combustion of the producer-gas assist each other in calcining the charge.

The air from the absorbers may be employed to assist combustion in both the vertical kiln and the rotary kiln. There is a pipe M leading from the absorbers to the vertical kiln, being connected at two points or in two planes therewith—namely, near the bottom of the stack and also near the bottom of the charge—and there is a pipe or conduit $M'$ conveying the heated air to the air-inlet pipe $a^2$. Air may be admitted at T to the pipe $T'$ to mix with the carbon dioxid before it enters the producers O $O'$. These producers are provided with air and steam inlets $o\ o'$, and valves $o^2$ are provided, by means of which the supply of gas to either producer may be shut off.

The producers O $O'$ are connected by a pipe U with a fan or blower $U'$, which forces producer-gas into the rotary kiln in the manner illustrated. The producers O $O'$ may be used singly or together, one being raised to incandescence while the other is producing CO. At first air may be drawn through one producer in order to obtain incandescence and a good heat in it, after which the gas, either alone or mixed with air introduced at T, or together with air or steam, or both, introduced directly into the producer at o o', is directed through it. At the same time air is being fed to the other producer, and when the first is cooled down by the reduction of the gas ($CO_2$ to CO) and the second producer heated to a bright incandescence the gas is directed from the first to the second producer, the reversals being made as the conditions require. If preferred, the gas can be made to pass through both producers at the same time and continuously. In this case a properly-regulated amount of air should be introduced at the same time, so as to maintain the proper temperature and conditions in the producer.

Preferably the producer-gas and the air introduced into the rotary kiln is heated before admission thereto. For this purpose I preferably employ stoves or regenerators V V' $V^2$ $V^3$ of the construction shown, the arrangement being such that the stoves or regenerators may be used alternately. The regenerators may be heated by hot clinker, wood, or other fuel, or by producer-gas, or such gas may be used in connection with other fuel. I have illustrated in Figs. 1 and 2 of the drawings the preferred arrangement of apparatus for heating the gas and air just before it enters the rotary kiln.

I have shown four regenerators V V' $V^2$ $V^3$, which are similar in construction to the absorbers N N'. The blower U' delivers to a pipe $U^2$, connected to the lower portions of the regenerators V and $V^3$. The air-supply pipe $a^2$ is connected to the lower portions of the regenerators V' $V^2$. The upper portions of the regenerators V $V^3$ are connected to a pipe v, which discharges into the rotary kiln. The upper portions of the regenerators V' $V^2$ are connected to a pipe v', to which the fuel-pipe a' is connected and which discharges into the rotary kiln. u indicates branch pipes, which convey producer-gas to the lower portions of the regenerators when they are being heated, and w indicates air-inlets to support combustion during the heating of the regenerators. Suitable valves are properly placed to regulate the admission and discharge of air and gas. By this arrangement the regenerators may be used alternately, one set being heated while the other set is employed to heat the gas and air entering the rotary kiln.

In Fig. 4 the organization of apparatus is substantially the same as in Fig. 1, except that the vertical kiln is placed immediately over the dust-box B instead of to one side thereof, taking the place of the stack $B^2$.

It will be understood that all or only part of the gaseous products of combustion or decomposition from the rotary kiln may be made to pass through the vertical kiln. It will be also understood that the rotary kiln may be operated to produce a large percentage of carbon monoxid by using a deficiency of air and an excess of fuel in the rotary kiln. When such is the case, air may be admitted to the vertical kiln in the manner shown, and the result will be that the carbon monoxid will burn in the vertical kiln and calcine the limestone or cement rock or the like therein. There being in such case no solid fuel charge in the vertical kiln, the gases issuing from the vertical kiln will be largely $CO_2$ containing little, if any, CO, but are converted into a combustible gas by being drawn through a retort or gas-producer, as above described. The gases from the rotary kiln can, however, be either rich or poor in carbon monoxid. In the latter case their sensible heat would be imparted to the vertical-kiln charge, the calcining of the charge being principally done by the producer-gas.

It will be understood that while I prefer to have the vertical kiln contain no solid fuel solid fuel may be employed, and the apparatus may be so operated as to produce carbon dioxid to be subsequently converted into carbon monoxid in the manner before explained.

Instead of limestone or cement-producing material other materials may be substituted in the vertical kiln, and my apparatus may be employed to dry or calcine many different materials. A temperature entirely sufficient to obtain either natural cement or Portland cement may be readily obtained. If the charge in the vertical kiln is limestone alone, the partially or completely calcined product from it can be used as lime or used in the manufacture of hydraulic cement. If the charge is cement-rock, cement-rock and limestone, cement-rock and shale, shale, limestone and shale, or any other material or combination of materials from which hydraulic cement can be manufactured, the partially or completely calcined product can be used for this purpose. These treatments will cause it to grind much more readily and also burn much more easily in the rotary kiln than if not thus treated. It might be possible to so operate the rotary kiln with a large excess of fuel and insufficient air for its complete combustion as to obtain enough carbon monoxid from the rotary-kiln gases to effect the calcining of the charge in the vertical kiln without returning any of the gas after it passed through the producer for this purpose.

While I have shown a rotary clinker-forming kiln of well-known construction, it will be understood that I may employ rotary kilns of other constructions used for various materials.

While I have shown a single vertical kiln and a single rotary kiln, the apparatus may be so organized that the gases from one or more rotary kilns may be made to deliver into a large vertical kiln or the gas from one rotary kiln may be made to pass into one or more vertical kilns. This can be easily done and is not illustrated in the drawings.

While the preheating of the producer-gas is shown only in connection with its use in the rotary kiln, it is understood that this gas can be preheated, as well as the air used for its combustion, for any other purposes in which such preheating is considered desirable.

I claim as my invention—

1. The herein-described process which consists in causing the highly-heated gaseous products of combustion and decomposition from a rotary kiln to pass through a charge of cement-producing material in a vertical kiln causing the gases to impart their sensible heat thereto, converting the carbon dioxid issuing from the vertical kiln into carbon monoxid and conveying such carbon monoxid to the vertical kiln to combine with the sensible heat from the rotary kiln to calcine the charge therein.

2. The herein-described process which consists in causing the highly-heated gaseous products of combustion and decomposition from a rotary kiln to pass through a $CO_2$-producing charge in a vertical kiln, converting the $CO_2$ issuing from the vertical kiln, or a portion of it, into CO and in burning such CO in the vertical kiln to calcine the charge therein.

3. The herein-described process which consists in causing the highly-heated gaseous products of combustion and decomposition from a rotary clinker-forming cement-kiln rich in carbon monoxid to pass through a $CO_2$-producing charge in a vertical kiln to which air is admitted and wherein such carbon monoxid is converted into carbon dioxid and then collecting and utilizing the carbon dioxid issuing from the vertical kiln.

4. The herein-described process which consists in causing the highly-heated gaseous products of combustion and decomposition from a rotary clinker-forming cement-kiln to pass through a $CO_2$-producing charge in a vertical kiln to which air is admitted and in which the temperature and conditions are such as to liberate $CO_2$ from the charge and to convert any CO coming from the rotary kiln into $CO_2$, then converting the $CO_2$, or a portion of it, issuing from the vertical kiln into CO and utilizing such CO while the calcined charge is collected and utilized, substantially as described.

5. The combination of a rotary kiln, a vertical kiln connected therewith, a gas-producer connected with the upper part of the vertical kiln and connections between the gas-producer and the lower part of the vertical kiln and also between the gas-producer and the rotary kiln.

6. The combination of a rotary kiln, a vertical kiln connected therewith, a gas-producer, a heat-absorber connected with the upper part of the vertical kiln, a gas-producer connected with said absorber, and connections between the air-spaces of the absorbers and the rotary kiln.

7. The combination of a rotary kiln, a vertical kiln connected therewith, a gas-producer, a heat-absorber connected with the upper part of the vertical kiln, a gas-producer connected with said absorber and connections between the air-spaces of the absorber and both kilns.

8. The combination of a rotary kiln, a vertical kiln connected therewith, in which the charge is burned under low pressure, a gas-producer connected with the upper part of the vertical kiln and a suction-pump or blower, for assisting the draft and reducing the pressure, interposed in such connections between the vertical kiln and the producer.

9. The combination of a rotary kiln, a vertical kiln connected therewith, a gas-producer connected with the upper part of the vertical kiln, means for conveying producer-gas from said producer to the rotary kiln, and a regenerator or stove for heating the producer-gas just before its delivery to the rotary kiln.

10. The combination of a rotary kiln, a vertical kiln connected therewith, a gas-producer connected with the upper part of the vertical kiln, means for conveying producer-gas from said producer to the rotary kiln, means for supplying air to the rotary kiln and a regenerator or stove for heating both the producer-gas and the air just before it enters the rotary kiln.

11. The combination of a rotary kiln, a vertical kiln, a gas-producer connected with the upper part of the vertical kiln, a heat-absorber interposed in said connections between the vertical kiln and the producer, means for conveying air from the heat-absorber to the rotary kiln, means for conveying gas from the producer to the rotary kiln, and a stove or regenerator for heating both the air and the gas just before they are delivered to the rotary kiln.

12. The combination of a rotary kiln, a vertical kiln connected therewith, a gas-producer connected with the upper portion of the vertical kiln, a heat-absorber interposed in such connections, means for conveying air from the heat-absorber to the vertical kiln and to the rotary kiln, means for conveying gas from the producer to the vertical kiln and to the rotary kiln, and means for heating the gas and air prior to their delivery to the kilns.

In testimony whereof I have hereunto subscribed my name.

BERNARD ENRIGHT

Witnesses:
PATRICK F. ENRIGHT,
SUSAN FINN ENRIGHT.